(12) United States Patent
Atia et al.

(10) Patent No.: US 10,133,509 B2
(45) Date of Patent: Nov. 20, 2018

(54) CONSISTENCY GROUP ABSTRACTION

(71) Applicant: INTERNATIONAL BUSINESS MACHINES CORPORATION, Armonk, NY (US)

(72) Inventors: Ohad Atia, Haifa (IL); Amalia Avraham, Petach Tikva (IL); Ran Harel, Kfar-Saba (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 367 days.

(21) Appl. No.: 14/988,965

(22) Filed: Jan. 6, 2016

(65) Prior Publication Data

US 2017/0192682 A1   Jul. 6, 2017

(51) Int. Cl.
  *G06F 12/00* (2006.01)
  *G06F 3/06* (2006.01)

(52) U.S. Cl.
  CPC ............ *G06F 3/065* (2013.01); *G06F 3/0604* (2013.01); *G06F 3/067* (2013.01); *G06F 3/0619* (2013.01); *G06F 3/0631* (2013.01); *G06F 3/0644* (2013.01)

(58) Field of Classification Search
  CPC ...... G06F 3/065; G06F 3/0619; G06F 3/0683; G06F 12/0868; G06F 2212/1032; G06F 2212/261; G06F 2212/283; G06F 2212/313
  See application file for complete search history.

(56) References Cited

U.S. PATENT DOCUMENTS

| 6,718,347 | B1 | 4/2004 | Wilson |
| 7,162,575 | B2 | 1/2007 | Dalal et al. |
| 7,693,877 | B1 | 4/2010 | Zasman |
| 2009/0019251 | A1* | 1/2009 | Helman ............ G06F 17/30138 711/171 |

(Continued)

OTHER PUBLICATIONS

Wright et al., "A Constraints-Based Resource Discovery Model for Multi-Provider Cloud Environments," Journal of Cloud Computing: Advances, Systems and Applications, Jun. 21, 2012 (23 pages).

(Continued)

*Primary Examiner* — Matthew Bradley
(74) *Attorney, Agent, or Firm* — Griffiths & Seaton PLLC

(57) ABSTRACT

Methods, computing systems and computer program products implement embodiments of the present invention that include identifying a set of storage services on multiple storage systems. A plurality of storage services are defined, each of the storage services comprising a subset of the storage resources, and a defined storage (SDS) system is configured comprising the defined storage services. Multiple sub consistency groups are configured, each of the sub consistency group comprising one or more logical volumes stored in a subset of the defined storage services on a given storage system, and a consistency group is configured comprising the multiple sub consistency groups. Upon detecting a snapshot condition, processing input/output operations to all the volumes in the sub consistency groups can be simultaneously suspended, a snapshot for each of the sub consistency groups is generated, and the processing of the input/output operations is resumed upon generating the respective snapshots.

17 Claims, 5 Drawing Sheets

(56) References Cited

U.S. PATENT DOCUMENTS

2010/0257326 A1* 10/2010 Otani .................. G06F 11/1451
711/162
2013/0311986 A1  11/2013 Arrouye et al.
2014/0078344 A1   3/2014 Yoon et al.
2014/0129719 A1   5/2014 Weber et al.
2015/0058467 A1   2/2015 Douglas et al.

OTHER PUBLICATIONS

Bermes et al., "Digital Preservation at the National Library of France: A Technical and Organizational Overview," World Library and Information Congress: 74th IFLA General Conference and Council, 2008 (10 pages).
List of IBM Patents or Patent Applications Treated as Related dated Mar. 30, 2016 (2 pages).
U.S. Appl. No. 14/988,950, filed Jan. 6, 2016 (35 pages).
U.S. Appl. No. 14/988,933, filed Jan. 6, 2016 (27 pages).

\* cited by examiner

US 10,133,509 B2

CONSISTENCY GROUP ABSTRACTION

FIELD OF THE INVENTION

The present invention relates generally to storage system snapshot management, and specifically to configuring consistency groups on software defined storage systems.

BACKGROUND

In a software-defined storage (SDS) system, storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scale-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including identifying a set of storage services on multiple storage systems, defining a plurality of storage services, each of the storage services comprising a subset of the storage resources, configuring a software defined storage (SDS) system comprising the defined storage services, configuring multiple sub consistency groups for the SDS system, each of the sub consistency group comprising one or more logical volumes stored in a subset of the defined storage services on a given storage system, and configuring, for the SDS system, a consistency group comprising the multiple sub consistency groups.

There is also provided, in accordance with an embodiment of the present invention an apparatus, including multiple storage devices, and a processor configured to identify a set of storage services on multiple storage systems, to define a plurality of storage services, each of the storage services comprising subset of the storage resources, to configure a software defined storage (SDS) system comprising the defined storage services, to configure multiple sub consistency groups for the SDS system, each of the sub consistency group comprising one or more logical volumes stored in a subset of the defined storage services on a given storage system, and to configure, for the SDS system, a consistency group comprising the multiple sub consistency groups.

There is further provided, in accordance with an embodiment of the present invention a computer program product, the computer program product including a non-transitory computer readable storage medium having computer readable program code embodied therewith, the computer readable program code including computer readable program code configured to identify a set of storage services on multiple storage systems, computer readable program code configured to define a plurality of storage services, each of the storage services comprising a subset of the storage resources, computer readable program code configured to arrange a software defined storage (SDS) system comprising the defined storage services, computer readable program code configured to arrange multiple sub consistency groups for the SDS system, each of the sub consistency group comprising one or more logical volumes stored in a subset of the defined storage services on a given storage system, and computer readable program code configured to arrange, for the SDS system, a consistency group comprising the multiple sub consistency groups.

BRIEF DESCRIPTION OF THE DRAWINGS

The disclosure is herein described, by way of example only, with reference to the accompanying drawings, wherein.

DETAILED DESCRIPTION OF EMBODIMENTS

In computer storage systems, a snapshot comprises a copy of data residing on a storage volume (e.g., a disk drive) that is created at a particular point in time. Since a full backup of a large data set can take a long time to complete, a snapshot may define the dataset to be backed up. Data associated with the snapshot is static, and is therefore protected from any subsequent changes to the data on the volume (e.g., a database update).

One typical implementation of a snapshot is called a "pointer snapshot." A pointer snapshot records an index of data locations to be protected on the volume. Pointer snapshots can be created fairly quickly and require far less storage space than is required to maintain a separate copy of the snapshot data.

Storage volumes can be joined to form "consistency groups". Storage systems supporting consistency groups may perform a snapshot operation on the consistency group rather than each of the storage volumes individually, thereby ensuring that the snapshot operation is performed on all the volumes at the same time.

Embodiments of the present invention provide methods and systems that enable software defined systems to configure and manage consistency groups. As described hereinbelow, a set of storage services are identified on multiple storage systems, and a plurality of storage services are defined, each of the storage services comprising a subset of the storage resources. Upon configuring a software defined storage (SDS) system comprising the defined storage services, multiple sub consistency groups can be configured, each of the sub consistency group comprising one or more logical volumes stored in a subset of the defined storage services on a given storage system, and a consistency group can be defined that comprises the multiple sub consistency groups.

Figure 1:
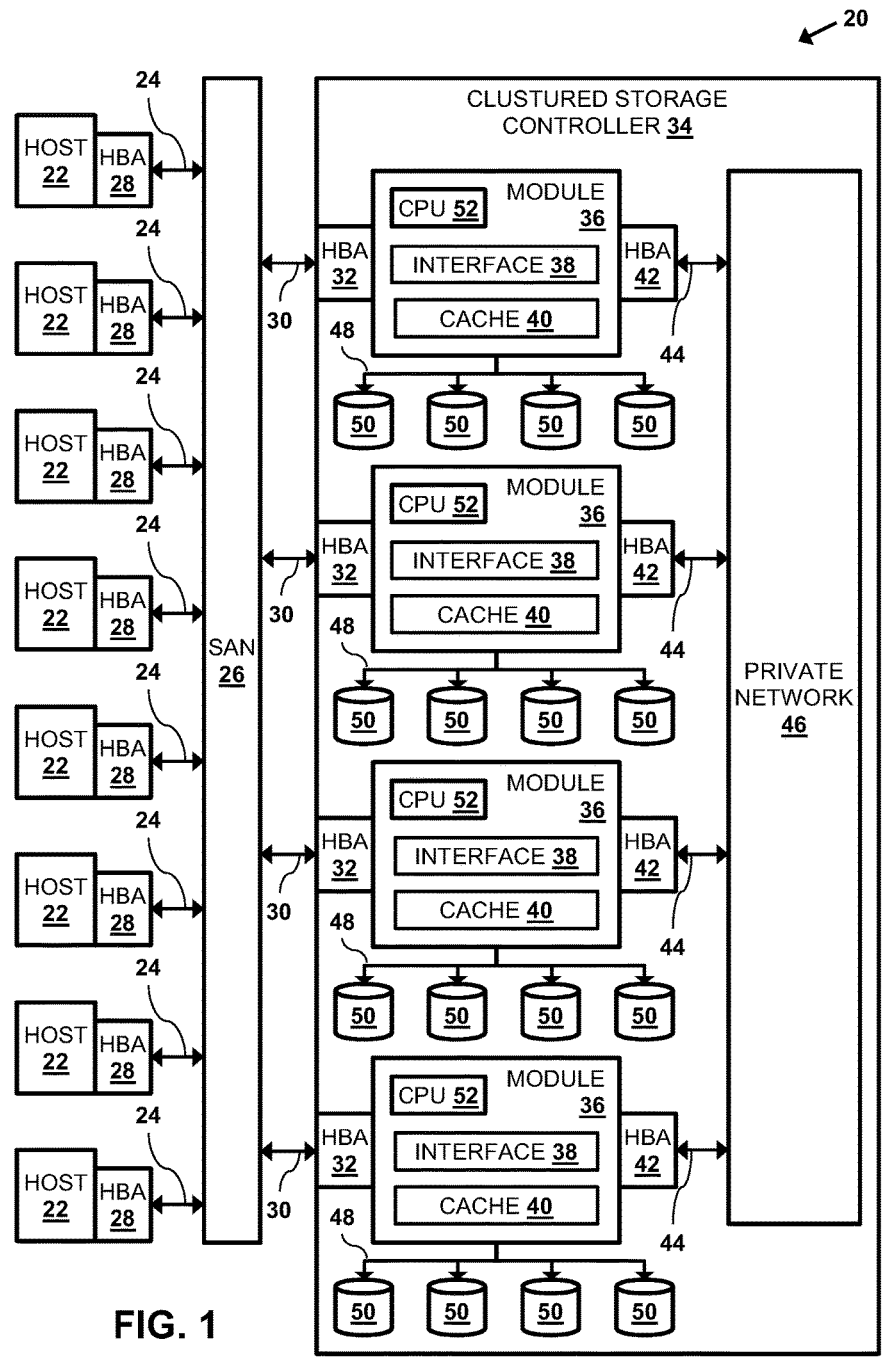
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
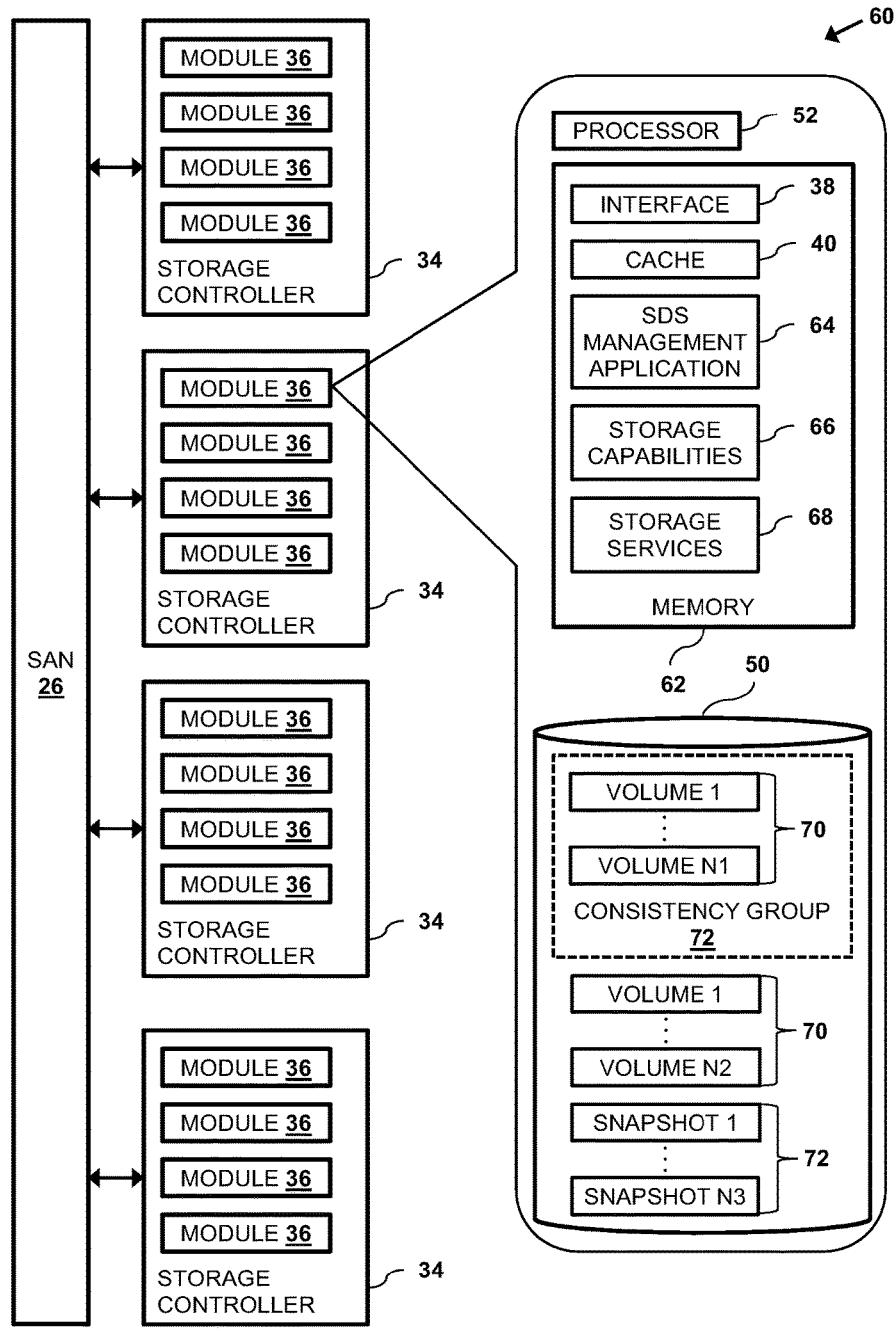
FIG. 2 is a block diagram that schematically illustrates configuration of multiple storage controllers configured as a software-defined storage (SDS) system, in accordance with an embodiment of the present invention.

FIG. 2 is a block diagram that schematically illustrates a SDS system 60 comprising multiple storage controllers 34, in accordance with an embodiment of the present invention. While FIG. 2 shows SDS system 60 comprising multiple clustered storage controllers 34, configuring the SDS system using any type of storage systems is considered to be within the spirit and scope of the present invention.

Each module 36 stores cache 38 and interface 40 in a memory 62. In one or more of modules 36, memory 62 stores an SDS management application 64, a set of storage capabilities 66 and a set of storage services 68. Processor 52 executes SDS management application 64 that uses storage resources in storage controllers 34 to configure and manage SDS system 60. In embodiments where SDS management application 64 executes in more than one module 36, the SDS management application can be configured as a distributed software application to manage SDS system 60.

In some embodiments, SDS system 60 managed by SDS management application 64 comprises storage resources in one or more modules 36 in one or more storage controllers 34 including a given module 36 comprising the SDS management application. In alternative embodiments, SDS system 60 comprises one or more modules 36 in one or more storage controllers 34 wherein none of the modules having the storage resources used by SDS system 60 include the SDS management application that manages the SDS system.

In embodiments of the present invention, the storage resources comprise physical and logical resources in storage controllers 34 such as storage space, processor resources such as processor utilization and networking resources such as network throughput. For example, storage devices 50 may comprise a mix of solid state disk drives (SSDs), higher capacity "slower" hard disk drives and lower capacity "faster disk drives, and the storage space may be allocated as blocks of storage space (e.g., 100 MB) on each type of the storage devise.

Storage capabilities 66 comprise various methods that storage services that SDS system 60 can offer for storing data such as encryption, compression and thin provisioned storage pools. In some embodiments, different types/levels of compression and different types/levels of encryption may be stored as separate storage capabilities 66.

Storage services 68 comprise blocks of storage resources configured with one or more storage capabilities. For example, a first given storage service 58 may comprise 128 MB of compressed storage space on an SSD, and a second given storage service 58 may comprise 500 GB of encrypted storage space on a hard drive that is configured as a thin pool.

In embodiments of the present invention, the storage resources may comprise logical volumes 70. In the configuration shown in FIG. 2, storage devices 50 comprise storage space that processor 52 can partition into logical volumes 70. Each logical volume can be stored on a single storage device 50 or can be distributed among multiple storage devices 50 in one or more storage controllers 34. Therefore a given storage service 68 may be distributed over multiple storage devices 50 and/or multiple storage controllers 34.

SDS management application 64 (e.g., via input from a system administrator) can define a sub consistency group 72 that comprises (i.e., references) a set of logical volumes 70 on a given storage controller 34. The set of logical volumes in consistency group may be stored either on a single storage device 50 or on multiple storage devices 50 in the given storage controller 34.

Figure 3:
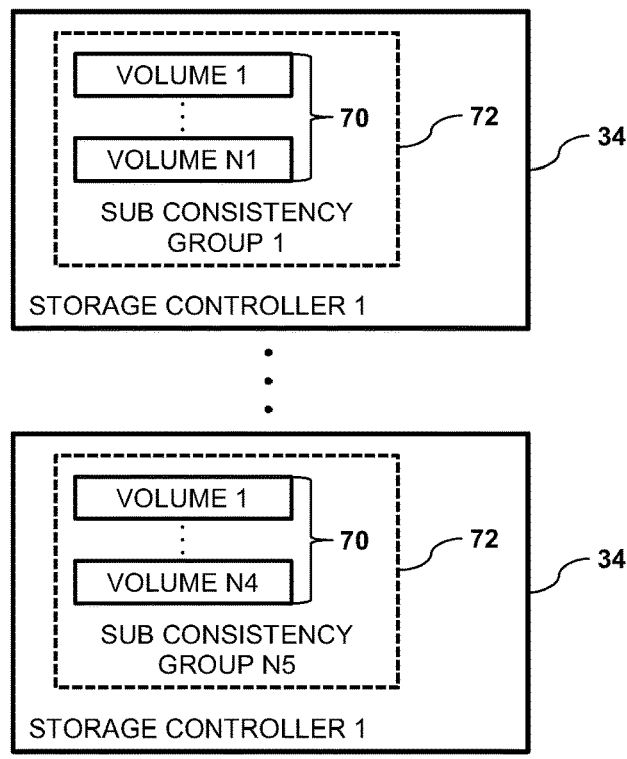
FIG. 3 is a block diagram that schematically illustrates sub consistency groups stored on the multiple storage controllers, in accordance with an embodiment of the preset invention.
Figure 4:
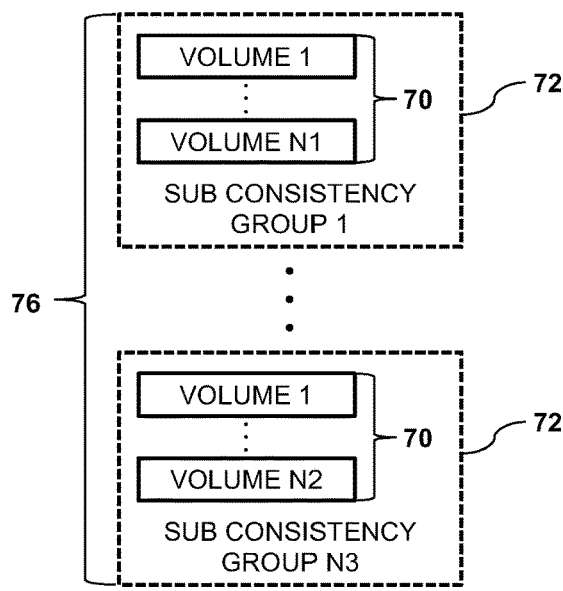
FIG. 4 is a block diagram that schematically illustrates a consistency group comprising the multiple sub consistency groups, in accordance with an embodiment of the preset invention.

FIG. 3 is a block diagram that schematically illustrates multiple sub consistency groups 72 stored on the multiple storage controllers, and FIG. 4 is a block diagram that schematically illustrates a consistency group 76 comprising the multiple sub consistency groups. As shown in FIGS. 3 and 4, each of storage controllers 34 may comprise a given sub consistency group 72 that comprises one or more logical volumes 70, and consistency group 76 encompasses the sub consistency groups that are distributed among multiple storage controllers 34.

In operation, upon a snapshot condition being met, SDS management application 64 simultaneously generates respective snapshots 74 for the each of the sub consistency groups 72 in consistency group 76. As described hereinbelow, one example of a snapshot condition being met is SDS management application 64 detecting that the storage devices storing the logical volumes in the consistency group are in input/output pause.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processors 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Consistency Group Management

Figure 5:
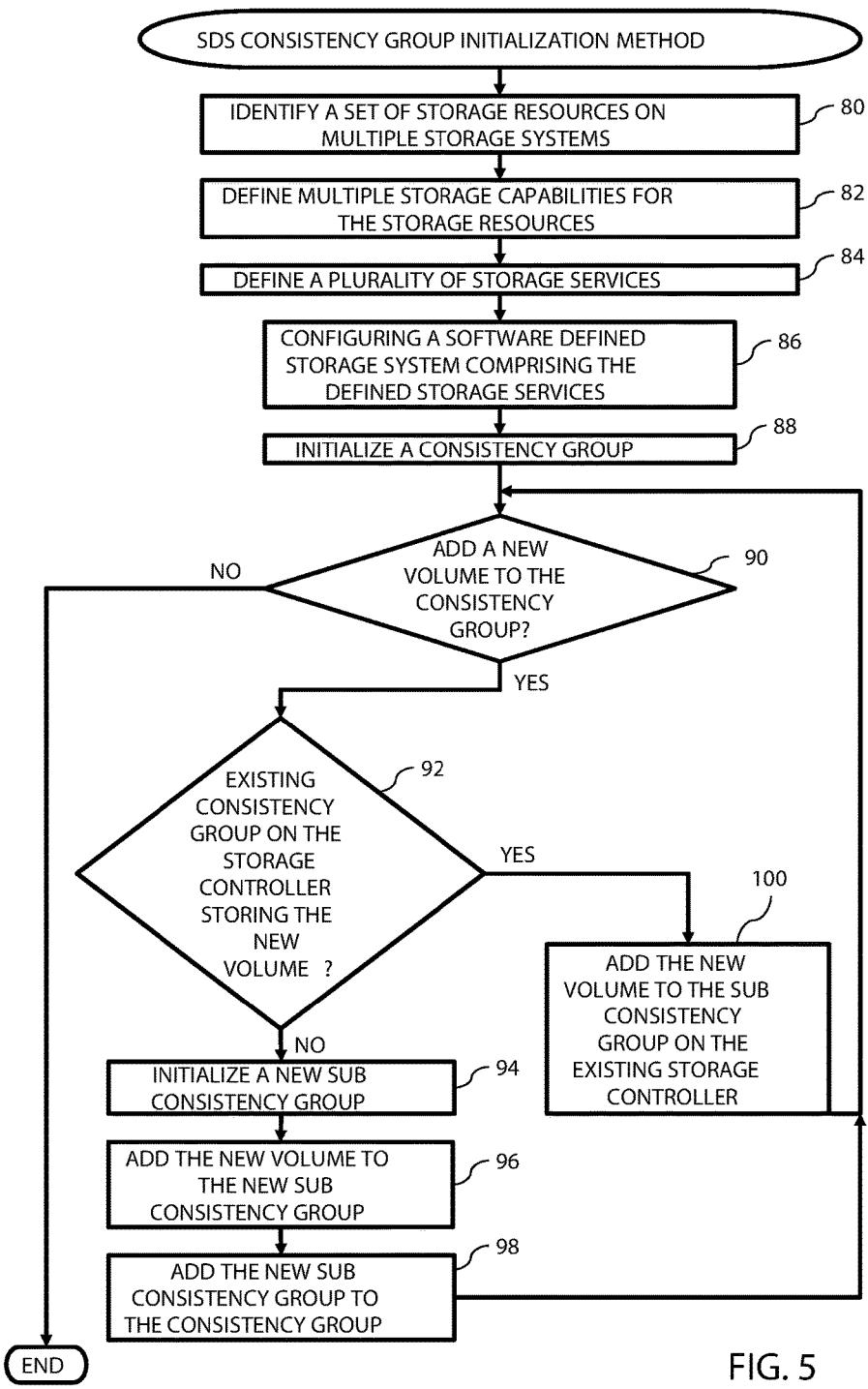
FIG. 5 is a flow diagram that schematically illustrates a method of initializing the consistency group on the SDS system, in accordance with an embodiment of the preset invention.

FIG. 5 is a flow diagram that schematically illustrates a method of configuring and managing consistency group 76 comprising sub consistency groups 72 in SDS system 60, in accordance with an embodiment of the present invention. In a first identification step 80, SDS management application 64 identifies a set of storage resources in storage controllers 34, and in a first definition step 82, the SDS management application defines multiple storage capabilities 66 for the identified storage resources.

In a second definition step 84, SDS management application defines a plurality of software services 68 that comprise respective subsets of the identified storage resources, and in a configuration step 86, the SDS management application configures SDS system 60 comprising the defined software services. The storage resources, the storage capabilities and the storage services are described supra in the description referencing FIG. 2. In some embodiments, a given storage service 68 may also comprise one or more storage capabilities 66 (i.e., in addition to a given subset of the storage resources).

In a first initialization step 88, SDS management application 64 initializes consistency group 76. In a first comparison step 90, if SDS management application 64 receives a request to add a given (i.e., a new) volume 70 to consistency group 76, then in a second comparison step 92, the SDS management application checks if there is a given (i.e., an existing) sub consistency group 72 on a given storage controller that stores the given volume.

If the given storage controller does not comprise a given sub consistency group 72, then in a second initialization step 94, SDS management application 64 initializes a new sub consistency group 72 on the given storage controller in a second initialization step, and adds the given volume to the new sub consistency group in a first addition step 96. In a second addition step 98, SDS management application 64 adds the new sub consistency group 72 to consistency group 76, and the method continues with step 90.

Returning to step 92, If the given storage controller comprises an existing sub consistency group 72, then in a third addition step 100, SDS management application 64 adds the given volume to the existing sub consistency group, and the method continues with step 90. Returning to step 90, the method ends when there are no additional volumes 70 to add to consistency group 76.

Figure 6:
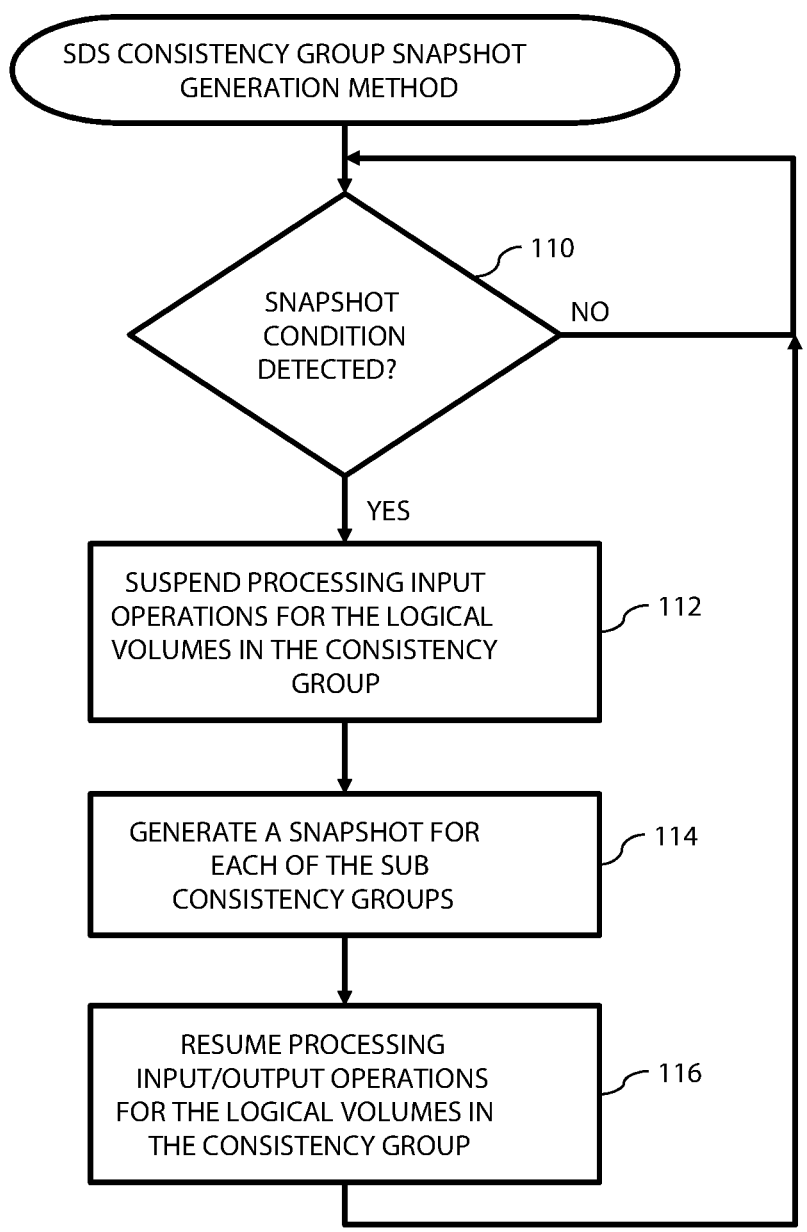
FIG. 6 is a flow diagram that schematically illustrates a method of generating a snapshot for the consistency group, in accordance with an embodiment of the preset invention.

FIG. 6 is a flow diagram that schematically illustrates a method of generating a given snapshot 74 for consistency group in SDS system 60, in accordance with an embodiment of the present invention. In a comparison step 110, SDS management application 64 monitors SDS system 60 to detect a snapshot condition. As described hereinbelow, one example of a snapshot condition being met is SDS management application 64 detecting that the storage devices storing the logical volumes in the consistency group are in input/output pause.

If SDS management application 64 detects a snapshot condition, then in a suspension step 112, SDS management application 64 suspends processing input/output requests for volumes 70 in consistency group 76. In a generation step 114, SDS management application 64 generates a new snapshot 74 for each of the sub consistency groups in consistency group 76. Finally, in a resumption step 116, SDS management application 64 resumes processing input/output requests for the volumes in consistency group 76, and the method continues with step 110.

In embodiments of the present invention, consistency group 76 may comprise a container for multiple logical volumes 70, so that they can be addressed as a single entity, and a given snapshot 74 for the consistency group means simultaneous snapshots 74 of the volumes in the consistency group, thereby ensuring consistent copies of the volumes as a group. To process a consistency group definition/configuration request, SDS management application 64 initializes logical volumes 70 on given storage service 68. In some embodiments, the set of the physical storage resources in SDS system 60 are distributed among multiple physical storage systems (i.e., storage controllers 34), and wherein the respective subset of the storage resources for a given storage service 68 associated with the consistency group is distributed among at least two of the multiple physical storage systems.

As described supra, each storage service 68 comprises a set of storage capabilities 66 and storage space (i.e., storage resources) that compiles with these capabilities, and a consistency group typically comprises a container for multiple logical volumes 70 so that they can be addressed as a single entity, including simultaneous snapshots 74. Using embodiments of the present invention, consistency group 76 can be defined as follows:

A user defines consistency group 72 as a set of volumes 70 from within a given storage service 68, unaware of their originating storage system 34.

An agreed signal can be sent to the given storage service from SDS management application 64 or the user when the storage systems are in I/O pause. A pre-defined schedule may also be used, e.g., if the storage systems are not used between 10:00 PM and 6:00 AM.

Once the agreed signal or scheduled time arrives, the given storage service can request a snapshot for every consistency group volume 70 from its respective storage system 34.

If needed, an acknowledgement of a successful/unsuccessful action (e.g., a snapshot) can be aggregated into the given storage service's consistency group snapshot status.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   identifying a set of storage resources on multiple storage systems;
   defining a plurality of storage services, each of the storage services comprising a subset of the storage resources;
   configuring a software defined storage (SDS) system comprising the defined storage services;
   configuring multiple sub consistency groups for the SDS system, each of the sub consistency group comprising one or more logical volumes stored in a subset of the defined storage services on a given storage system;
   configuring, for the SDS system, a consistency group comprising the multiple sub consistency groups;
   detecting, by a management application, that the storage resources storing the one or more logical volumes are in input/output pause; and
   responsive to detecting the input/output pause, simultaneously suspending processing input/output operations to only the volumes in the sub consistency groups, generating a snapshot for each of the sub consistency groups, and resuming the processing of the input/output operations to the volumes in the sub consistency groups upon generating the respective snapshots.

2. The method according to claim 1, and comprising defining multiple storage capabilities for a set of storage resources, and wherein a given storage service comprises one or more of the storage capabilities.

3. The method according to claim 1, wherein each of the storage capabilities is selected from a group consisting of a compression capability, an encryption capability and a thin provisioning capability.

4. The method according to claim 1, wherein the storage resources comprise additional resources selected from a group consisting of processing resources and networking resources.

5. The method according to claim 1, wherein the storage resources are distributed among multiple storage systems, and wherein the given storage resource is distributed among more than one of the storage systems.

6. The method according to claim 1, wherein the given storage service comprises one or more additional storage capabilities not required by the request.

7. An apparatus, comprising:
   multiple storage devices; and
   a processor configured:
      to identify a set of storage resources on multiple storage systems,
      to define a plurality of storage services, each of the storage services comprising subset of the storage resources,
      to configure a software defined storage (SDS) system comprising the defined storage services,
      to configure multiple sub consistency groups for the SDS system, each of the sub consistency group comprising one or more logical volumes stored in a subset of the defined storage services on a given storage system,
      to configure, for the SDS system, a consistency group comprising the multiple sub consistency groups,
      to detect, by a management application, that the storage resources storing the one or more logical volumes are in input/output pause, and
      to, responsive to detecting the input/output pause, simultaneously suspend processing input/output operations to only the volumes in the sub consistency groups, generating a snapshot for each of the sub consistency groups, and resuming the processing of the input/output operations to the volumes in the sub consistency groups upon generating the respective snapshots.

8. The apparatus according to claim 7, wherein the processor is configured to define multiple storage capabilities, and wherein a given storage service comprises one or more of the storage capabilities.

9. The apparatus according to claim 7, wherein each of the storage capabilities is selected from a group consisting of a compression capability, an encryption capability and a thin provisioning capability.

10. The apparatus according to claim 7, wherein the storage resources comprise additional resources selected from a group consisting of processing resources and networking resources.

11. The apparatus according to claim 7, wherein the storage devices are distributed among multiple storage systems, and wherein the given storage resource is distributed among more than one of the storage systems.

12. The apparatus according to claim 7, wherein the given storage service comprises one or more additional storage capabilities not required by the request.

13. A computer program product, the computer program product comprising:
a non-transitory computer readable storage medium having computer readable program code embodied therewith, the computer readable program code comprising:
computer readable program code configured to identify a set of storage resources on multiple storage systems;
computer readable program code configured to define a plurality of storage services, each of the storage services comprising a subset of the storage resources;
computer readable program code configured to arrange a software defined storage (SDS) system comprising the defined storage services;
computer readable program code configured to arrange multiple sub consistency groups for the SDS system, each of the sub consistency group comprising one or more logical volumes stored in a subset of the defined storage services on a given storage system;
computer readable program code configured to arrange, for the SDS system a consistency group comprising the multiple sub consistency groups;
computer readable program code configured to detect, by a management application, that the storage resources storing the one or more logical volumes are in input/output pause; and
computer readable program code configured to, responsive to detecting the input/output pause, simultaneously suspend processing input/output operations to only the volumes in the sub consistency groups, generating a snapshot for each of the sub consistency groups, and resuming the processing of the input/output operations to the volumes in the sub consistency groups upon generating the respective snapshots.

14. The computer program product according to claim 13, and comprising computer readable program code configured to define multiple storage capabilities, and wherein a given storage service comprises one or more of the storage capabilities.

15. The computer program product according to claim 13, wherein each of the storage capabilities is selected from a group consisting of a compression capability, an encryption capability and a thin provisioning capability, and wherein the storage resources comprise additional resources selected from a group consisting of processing resources and networking resources.

16. The computer program product according to claim 13, wherein the storage resources are distributed among multiple storage systems, and wherein the given storage resource is distributed among more than one of the storage systems.

17. The computer program product according to claim 13, wherein the given storage service comprises one or more additional storage capabilities not required by the request.

* * * * *